Figure 1:
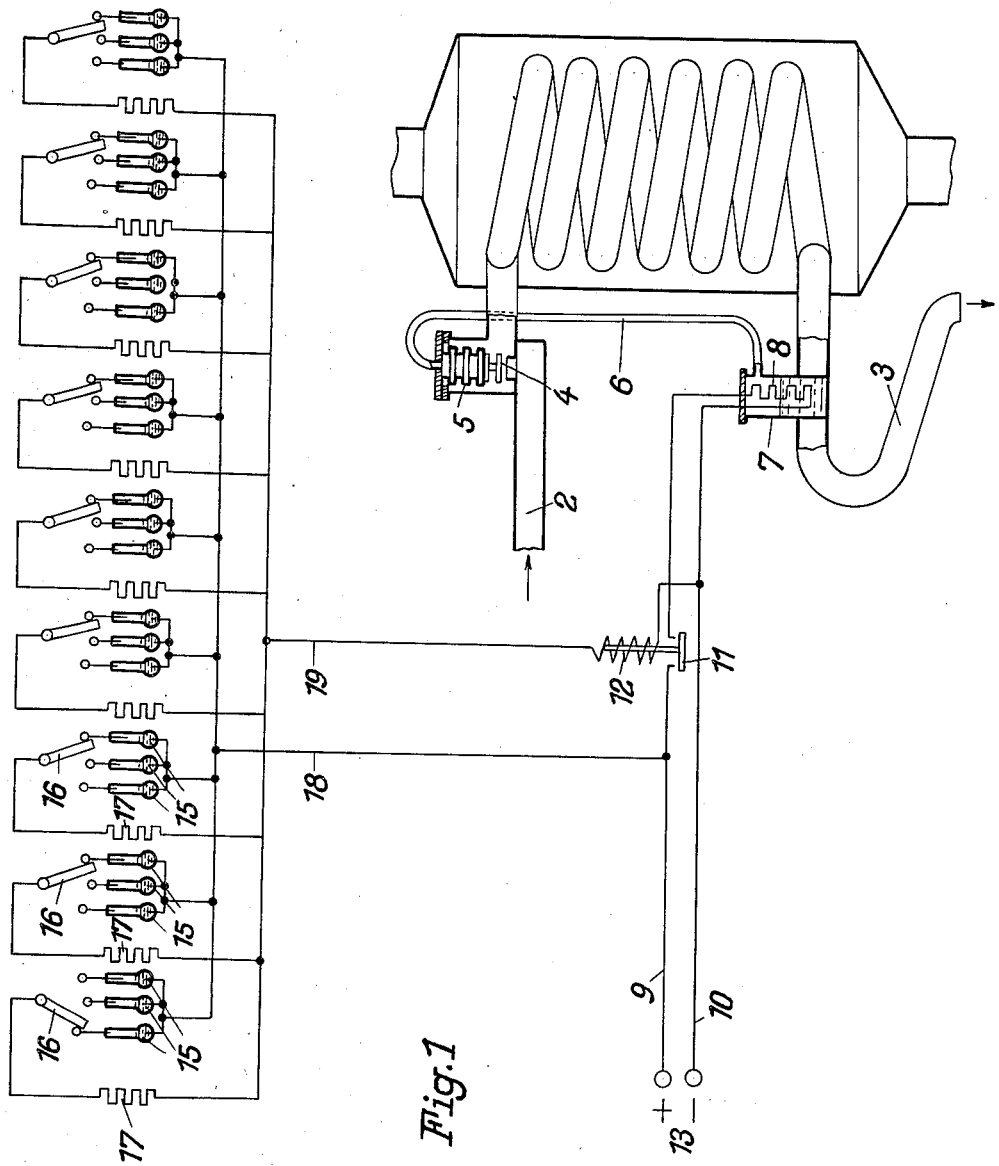

July 6, 1937.  F. VON SCHÜTZ  2,086,452
AUTOMATIC REGULATING DEVICE IN AIR HEATING PLANTS FOR RAILWAY VEHICLES
Filed Dec. 3, 1935  5 Sheets-Sheet 4

Inventor:
Friedrich von Schütz
Attorneys:
Bailey & Parson

July 6, 1937. F. VON SCHÜTZ 2,086,452
AUTOMATIC REGULATING DEVICE IN AIR HEATING PLANTS FOR RAILWAY VEHICLES
Filed Dec. 3, 1935 5 Sheets-Sheet 5

Inventor:
Friedrich von Schütz
Attorneys:
Bailey & Parson

Patented July 6, 1937

2,086,452

UNITED STATES PATENT OFFICE 2,086,452

AUTOMATIC REGULATING DEVICE IN AIR HEATING PLANTS FOR RAILWAY VEHICLES

Friedrich von Schütz, Berlin-Lichterfelde-West, Germany, assignor to N. V. Machinerieen-en Apparaten Fabrieken "Meaf", Utrecht, Netherlands Application December 3, 1935, Serial No. 52,738
In Germany December 4, 1934

7 Claims. (Cl. 236—68)

This invention relates to a device for automatically regulating air heating in railway compartment cars, in which the fresh air treated in a heater operated by a heating medium, such as steam, warm water, gases of combustion, waste gases, etc., is conducted to the individual compartments of the vehicle.

The invention refers in particular to a device for regulating the supply of the heating medium to the air heater and thus the temperature of the air coming out of the heater and to be passed into the compartments, wherein the amount of heat actually required in the various compartments determines the supply of heating medium to the heater, the supply being throttled whenever the desired room temperature is exceeded in a certain number of compartments and increased if the room temperature is not attained therein.

For this purpose, in the piping supplying the heating medium to the air heater a valve is arranged which is actuated by a thermal relay, and the evaporation and consequent rise in pressure of an evaporating liquid heated electrically and inclosed in a system of vessels having a yielding wall is utilized for adjusting this valve. The liquid is heated by an electric heating element disposed in the evaporating vessel or at another point of the thermal relay always subjected to wetting and having a maximum current relay connected in its circuit. The exciting winding of this relay is traversed by the sum total of the currents switched on by contact thermometers in the various compartments, and the relay is so constructed that it will close the circuit of the heating element in the evaporating vessel of the thermal relay when a certain number of the contact thermometers makes contact and the total current intensity exceeds therefore a certain value. Owing to the evaporation of the liquid caused thereby and the rise in pressure connected therewith the member controlling the supply of the heating medium to the heater will be throttled. On the other hand, if in the same number of compartments the room temperature at which the thermometers make contact drops below, the maximum current relay will switch off the heating of the thermal relay, so that the contents thereof will be condensed, its pressure lowered and the valve for the heating medium opened again.

The device is still imperfectly functioning in so far as, owing to the unavoidable lagging of the thermostats in the compartments, fluctuations in regulation might be easily produced. It is particularly possible that after the desired room temperature has been attained in a number of compartments and the maximum current relay has therefore switched on the heating of the evaporating vessel of the thermal relay, the steam inlet valve will close with the result that, since the air heater possesses only slight thermal capacity, the fresh air will be supplied cold, which is disagreeable to the passengers.

Inversely, it may happen that after the room temperature in a number of compartments has fallen below and the heating of the evaporating vessel of the thermal relay has therefore been switched off by the maximum current relay, the steam inlet valve will fully open, so that the fresh air supplied to the car will suddenly be heated to a considerable degree and the steam entering the air heater in excessive quantity will not be condensed, but come out of the heater still in vaporous form and incompletely utilized.

The invention aims at avoiding these undesirable fluctuations in regulation and attains downward limitation of the temperature of the heating air coming out of the heater by putting a stop to the heating of the evaporating vessel of the thermal relay causing the closing of the steam inlet valve when the limit is passed, either by interrupting the heating thereof or blowing cold air against it.

If upward limitation of the temperature of the air coming from the heater is to be effected also, the invention provides, when the upper limit is passed, for heating the evaporating vessel and thus throttling the steam inlet valve, which can be done by switching on the heater for the vessel or blowing warm air against it.

The temperature of the heating air can be downwardly limited in the most simple manner by providing in the circuit of the heating element a cut-in relay the exciting circuit of which, besides the maximum current relay, comprises also a contact thermometer exposed to the temperature of the heating air leaving the heater.

According to the invention, upward limitation of the temperature of the heating air can be achieved by using as filling for the evaporating vessel of the thermal relay a liquid which at the upper limiting temperature of the air develops sufficient steam pressure to adjust the steam inlet valve, and by causing an air current branched off from the heating air to play around the evaporating vessel.

Another method superior to the one just described in so far as the lower and upper limits of the temperature of the heating air coincide and, furthermore, an opportunity is afforded of varying this limiting temperature according to outside temperature consists in continually conducting current and thereby heat to the heating element of the evaporating vessel by means of a permanent resistance in shunt with the maximum current relay and, on the other hand, in continually withdrawing heat from the evaporating vessel by blowing a current composed of cold and warm air against it. For example, if the dependence of the limiting temperature upon the outside temperature is to be arranged so as to keep the mean of both temperatures constant, i. e., to make the heating air the warmer the lower the outside temperature is, and vice versa, the mixture is formed of equal parts of cold and warm air by corresponding throttling of the hot and cold air conduits. The amount of blower air and the permanent resistance are so dimensioned that the contents of the evaporating vessel are preheated to a temperature at which the pressure of the filling brings about an intermediate position of the steam inlet valve.

If the balance between the supply and discharge of heat is disturbed by the downward or upward deviation of the temperature of the warm air from the control value, the temperature of the contents of the evaporating vessel will be varied thereby and thus an adjustment of the steam inlet valve effected, which counteracts the change in the temperature of the heating air.

When during switching on of the full heating current by the maximum current relay the cone of the steam inlet valve is brought closer to its seat, the temperature of the heating air coming out of the heater will be lowered. As a result thereof, the mixed air flowing around the evaporating vessel will become colder, so that the vessel will be more effectively cooled and the closing of the steam inlet valve retarded. The energy transmitted to the heating element beyond the base load when the maximum current relay is switched on effects such throttling of the steam valve that after establishment of the balance between the absorption of heat by the heating element and the emission of heat to the blower air the heating air, on coming out of the heat exchanger, will be colder to the extent of $2\Delta t$ if $\Delta t$ represents the lowering of the temperature of the blower air required for restoring the balance at the evaporating vessel. The steam supply to the heater is therefore not fully shut off when the desired room temperature is exceeded in a number of compartments but merely throttled so as to cause the heating air to become colder.

Constant heating of the evaporating vessel simultaneously affords the advantage that the contents thereof are preheated and consequently quickly respond to the regulating impulses of the maximum current relay.

This arrangement is, however, still imperfect inasmuch as the control of the valve position with respect to the temperature of the blower air involves difficulties, since slight variations of this temperature equalling only half the variation of the temperature of the cold or warm air sometimes insufficiently affect the evaporator and thus the steam inlet valve.

A construction free from this drawback and permitting accurate and non-fluctuating regulation consists in arranging in an air current composed of a mixture of cold and warm air a contact thermometer which when attaining its contact temperature, possibly by means of a relay, bridges the maximum current relay, so that base loading of the heating element takes place intermittently. The contact thermometer insures the maintenance of a constant temperature of the blown air and thereby of a heating air temperature depending upon the outside temperature. In this instance, too, complete closing or excessive opening of the steam valve is avoided.

This arrangement does not necessarily require the blowing of air against the evaporating vessel, but this feature may be retained so as to have the advantage of preheating the evaporating vessel and thereby insure quick response of the thermal relay during closing of the maximum current relay.

To become independent of the composition of the air blast, which in certain cases might cause difficulties and lead to errors, the heating element of the thermal relay in another embodiment of the invention is switched on and off by a contact controlled by a two-part temperature feeler one part or branch of which is exposed to cold air, i. e., the outside temperature, and the other to the temperature of the heating air. The temperature feelers may be constructed as solid expansion rods or as vessels filled with an expansion liquid and having a yielding wall. To avoid great lengths of the rods and large volumes of the vessels, which in summer would require expansion spaces, provision for leverage between the temperature feelers and the contact to be actuated by them is made. The expansion members, when a certain mean value of the temperatures to which they are exposed is exceeded, close a contact which switches on the heating element by means of a relay.

This arrangement affords an opportunity of providing instead of the maximum current relay which cuts in at a certain current intensity and cuts out when this intensity falls below means for continuously influencing the steam inlet valve in dependence upon the number of heated compartments. For this purpose, one arm of the contact is flexible and adjusted by a magnet coil flown through by the sum total of the compartment regulating currents.

In case of a steam heated air heater the evaporating vessel of the thermal relay or a vessel in communication therewith may be arranged, according to the invention, in the condensate discharge piping of the heater. The condensate will then preheat the contents of the evaporating vessel to such a degree that only short additional heating by the heating element is needed to bring them up to the temperature required for adjusting the steam inlet valve, whereby rapid response of the thermal relay is attained.

In this construction the supply of live steam is throttled also when the temperature of the condensate exceeds a certain value, as with a suitably selected filling liquid the contents of the evaporating vessel will likewise evaporate and bring the cone of the steam inlet valve nearer to its seat. The device thus simultaneously serves for avoiding waste steam losses.

Figure 2:
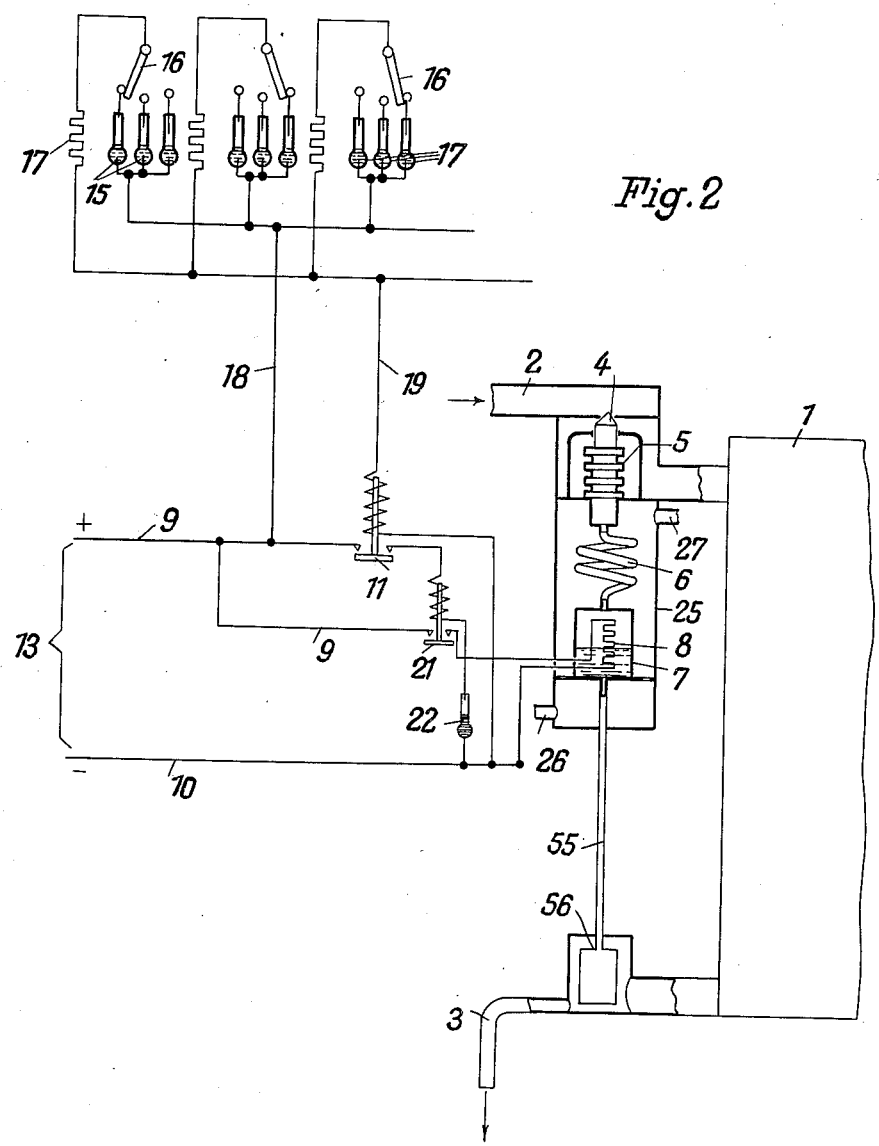
Figure 3:
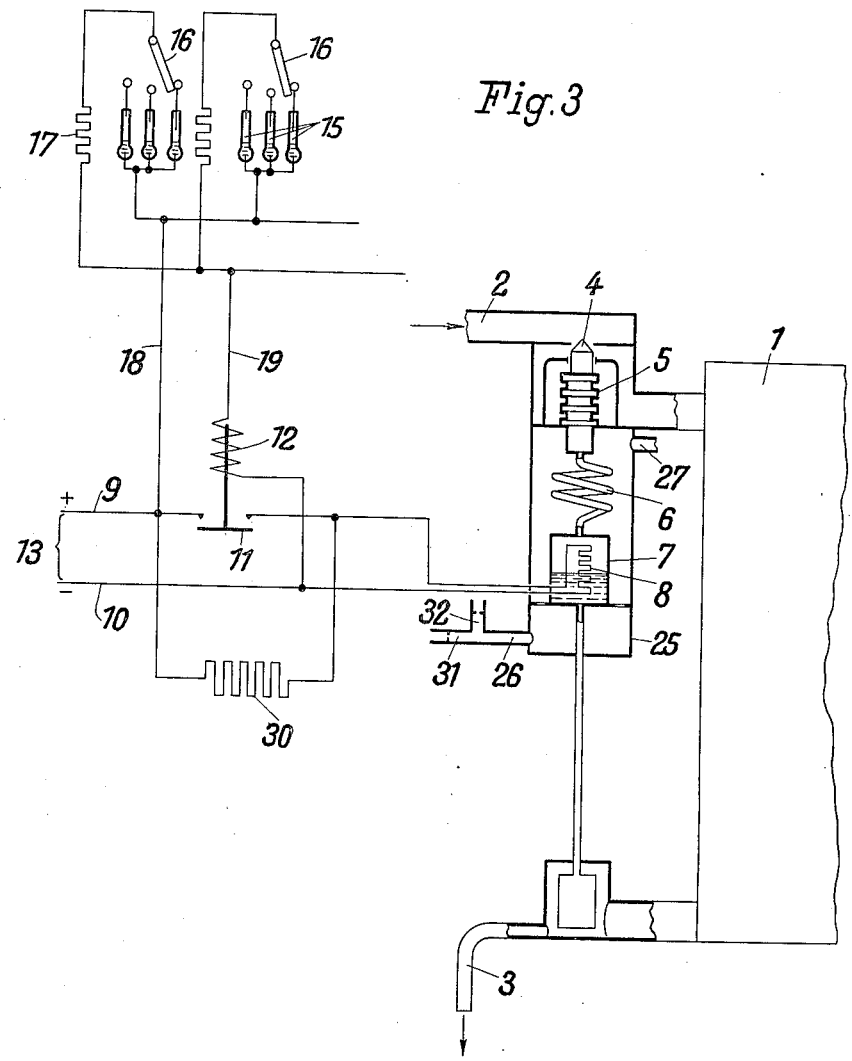
Figure 4:
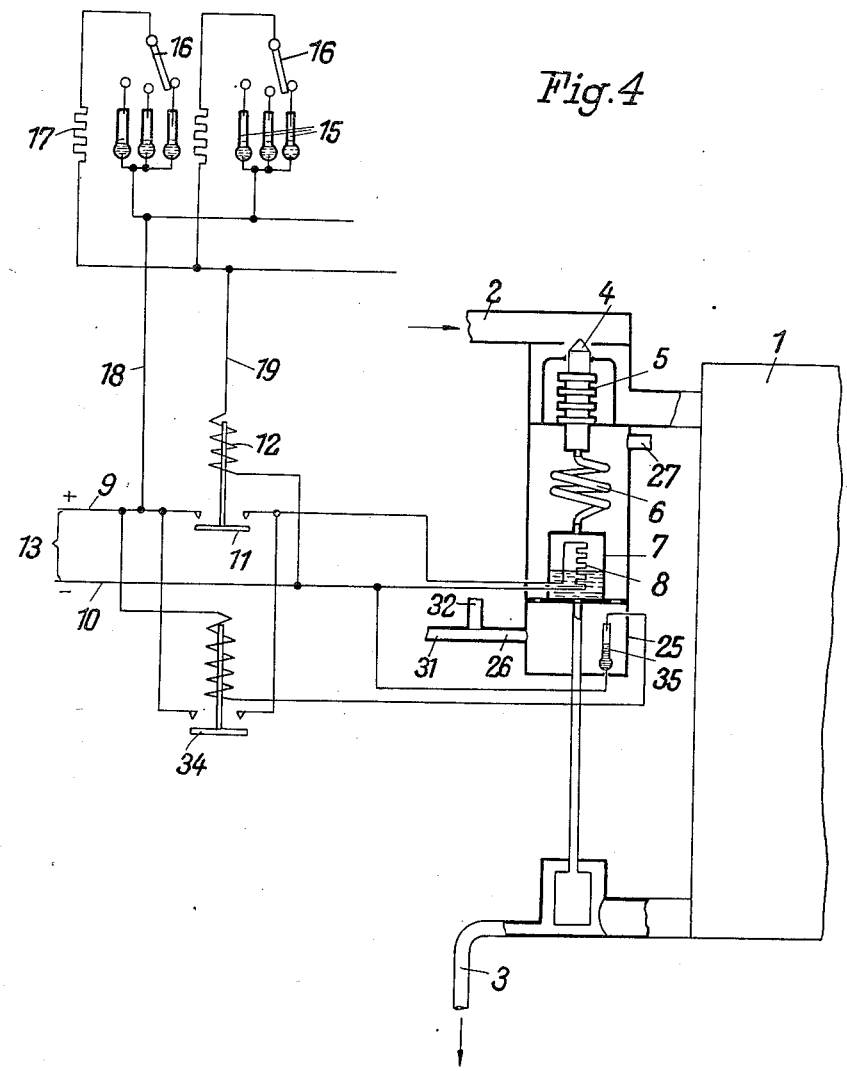
Figure 5:
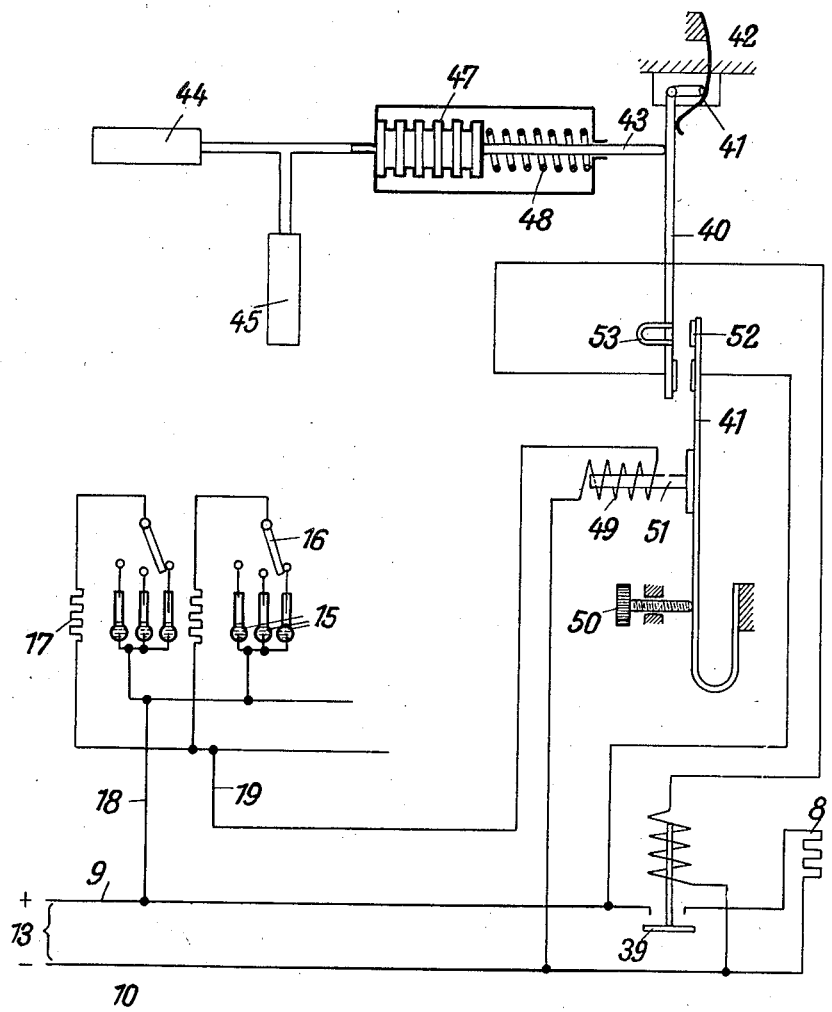

By way of example, several embodiments of the invention are diagrammatically illustrated in the accompanying drawings, in which Figure 1 shows a device for regulating the steam supply to a steam heated air heater, the heating element of the thermal relay being switched on and off by a maximum current relay through the exciting winding of which the sum total of the current flows which are switched on by the contact makers in the compartments; Fig. 2 shows an improved device provided with a contact thermometer exposed to the air coming out of the heater for cutting out the heating element of the thermal relay when the contact temperature is not maintained; Fig. 3 shows a modification of the device according to Fig. 1, wherein the heating element has a permanent base load and the evaporating vessel of the thermal relay is exposed to an air blast composed of cold and warm air; Fig. 4 shows an improvement of the device according to Fig. 3, wherein the heating element is switched on by a contact thermometer exposed to the air blast composed of cold and warm air; and Fig. 5 shows still another modification, wherein the heating element is controlled by a contact actuated by two temperature feelers.

In all embodiments shown 1 is the air heater comprising substantially a pipe system through which the heating medium, such as steam, etc., flows and which is surrounded by the air to be heated. The air heater 1 is supplied with heating steam by the conduit 2, the condensate passing off through the piping 3. In the live steam piping the steam inlet valve 4 is arranged the cone of which is connected with the movable bottom of the spring body 5. By means of the narrow piping 6 the inside of the spring body 5 is connected with the evaporating vessel 7 containing a slight amount of an evaporable liquid like acetone. The spring body 5 located near the hot live steam piping and thus representing the hottest point of the system 5, 6, 7 contains superheated acetone vapor. In the evaporating vessel 7 the electric heating element 8 is disposed which is connected to the voltage source 13 by the conductors 9 and 10.

In each compartment there are, for example, three contact thermometers 15 which make contact at different temperatures and of which the one corresponding to the desired compartment temperature is switched on by means of the switch 16. An electric resistance 17 is connected in series with each of these groups of thermometers and simultaneously serves as heating element of a thermal relay which when the desired room temperature is exceeded and the contact thermometer 15 closes the circuit throttles the supply of warm air from the joint main piping to the compartment concerned.

All contact thermometers 15 and the heating elements 17 of the various compartments are connected in parallel and connected to the voltage source 13 by the conductors 18, 19 and 9, 10.

In the construction shown in Fig. 1 the line 9 connecting the heating element 8 of the thermal relay to the voltage source 13 is provided with the maximum current relay 11 the exciting winding 12 of which is connected in the line 19, so that the sum total of all currents switched on by the contact thermometers 15 passes through the winding 12. The relay 11 is so adjusted that it will close the circuit of the heating element 8 when a certain number, say, seven, of the contact thermometers make contact. The evaporating vessel 7 of the thermal relay is built into the condensate discharge piping 3 of the air heater 1 so as to have the outcoming condensate play about it.

The device functions as follows: If the temperature of a compartment exceeds the desired degree, the contact thermometer 15 closes the circuit of the heating element 17 and the supply of hot air to the compartment concerned is throttled by the respective thermal relay, not shown.

Should the temperature in seven of nine compartments become excessive, the current flowing through the exciting winding 12 of the maximum current relay 11 attains a value which results in the switching on of the heating element 8. Owing to the heating, the filling liquid of the evaporating vessel 7 evaporates and the rise in pressure caused thereby extends the spring body 5, so that the supply of live steam to the air heater 1 is throttled. The lowering of the temperature of the heating air brings about a gradual reduction of the temperature prevailing in the compartments, which causes the contact thermometers 15 to open again. The maximum current relay 11 releases and interrupts the heating of the vessel 7. The liquid gradually condenses, and the steam inlet valve 4 is opened again.

If the temperature of the condensate flowing off through the piping 3 exceeds a certain limit, the contents of the evaporating vessel 7 will evaporate also and throttle the steam inlet valve 4. By corresponding loading of the inlet valve 4 the maximum temperature of the condenser can be adjusted to prevent incomplete utilization of the steam in the air heater.

The construction according to Fig. 2 resembles, in the main, the one shown in Fig. 1, but the line 9 connecting the heating element 17 of the thermal relay to the voltage source 13 is interrupted by the cut-in relay 21 in the exciting circuit of which the maximum current relay 11 and a contact thermometer 22 are arranged, the latter being positioned in the warm air conduit at the exit from the heater 1 and making contact at say, 25° C.

The evaporating vessel 7 of the thermal relay comprising the heating element 8 is not built into the condensate discharge piping 3, but connected by the pipe 55 with a special vessel 56 filled also with an easily evaporable liquid and disposed in the condensate discharge piping 3, whereby the same effect is attained.

This device operates as follows:

If the temperature in a compartment exceeds the desired degree, the contact thermometer 15 closes the circuit of the heating element 17 concerned and the supply of hot air to the compartment will be throttled by the respective thermal relay, not shown. Should the temperature in seven of the nine compartments rise beyond the limit, the current flowing through the exciting winding 12 of the maximum current relay will attain a value causing the relay 11 to respond. Current will therefore pass through the winding 23 of the relay 21, so that the relay pulls up and switches on the heating element 8. Owing to heating, the filling liquid of the vessel 7 evaporates, and the rise in pressure caused thereby extends the spring body 5, whereby the supply of live steam to the air heater 1 is throttled. When, owing to the throttling of the steam, the temperature of the air coming out of the heater drops below the contact temperature of the thermometer 22, the latter will interrupt the energization of the relay 21 and thus the heating of the evaporating vessel 7 whose contents condense, so that the steam inlet valve is opened again. In this manner the temperature of the heating air flowing into the car is prevented from dropping below 25° C.

If it is desired to prevent also a rise of temperature of the heating air beyond an upper limit of, say, 60° C., the thermal relay controlling the steam inlet valve should be filled with a liquid which at that temperature develops a pressure sufficient to adjust the valve and to expose the evaporating vessel to an air current branched off from the heating air when coming out of the heater. For this purpose, the evaporating vessel 7 is enclosed in a casing 25 through which a warm air current is guided by means of the supply piping 26 and the discharge piping 27. When the temperature exceeds 60° C., the evaporating liquid develops in the evaporator 7 a pressure which gradually closes the inlet valve 4 and thus throttles further steam supply to the heater.

In the construction according to Fig. 3 the maximum current relay 11, as in the arrangement shown in Fig. 1, is provided in the circuit of the heating element 8 and is bridged by a permanent resistance 30, so that current continually flows through the heating element 8. The evaporating vessel 7 is enclosed in a casing 25 supplied with a mixture of cold and warm air by the conduit 26. This air blast can, for instance, be produced by connecting the conduit 27 to the suction side of the heating blower and supplying cold air through the connection 31 and warm air through the connection 32, both connections being provided with adjustable throttles permitting accurate adjustment of the mixture, for example at the rate of 1:1. The permanent resistance 30 and the amount of air are dimensioned so that at the desired hot air temperature depending upon the outside temperature the heat supply to the evaporating vessel 7 by the current passing through the resistance 30 and the discharge of heat by the air blast playing around the vessel 7 are balanced at a temperature of the contents of the evaporating vessel at which the steam pressure developed will keep the steam inlet valve 4 at an intermediate position.

If the temperature of the hot air rises beyond the desired limit, the temperature of the air blast will rise also, with the result that less heat is withdrawn from the evaporating vessel 7, the temperature of its contents rises and a pressure will be developed which throttles further steam supply to the heater until the temperature of the heating air has dropped again to the proper value. Inversely, when the temperature drops, the pressure of the contents of the evaporating vessel will be reduced, whereby the steam inlet valve will be opened and better heating of the air effected.

When the maximum current relay 11 operates, energy is supplied to the heating element no longer by a resistance but directly, i. e., at increased current intensity. The result is that the steam valve throttles until the heating air and thus the air blast become so much colder that the balance between the supply of heat to, and the discharge of heat from, the evaporating vessel is reestablished. Therefore, when the desired room temperature has been reached in a certain number of compartments, the limiting temperature of the heating air is lowered, and the air blast prevents upward or downward deviations therefrom.

In the construction according to Fig. 4 the maximum current relay 11 in the circuit of the heating element 8 is bridged by a cut-in relay 34 the exciting winding of which is connected to the voltage source 13 or another voltage source, and a contact thermometer 35 is provided which makes contact at, say, 20° C. and which is exposed to the air blast by being for instance disposed within the casing 25.

Heating of the evaporating vessel 7 in this device is effected intermittently by causing the relay 34 to switch on the heating element 8 and thus throttle the steam inlet valve when the heating air exceeds the desired degree and the air blast the contact temperature of the thermometer 35 and, inversely, to switch off the heating element 8 and to open the steam inlet valve when the temperature of the heating air falls below the limit.

By subjecting the evaporating vessel 7 to an air blast excessive dropping of the temperature of the heating air at the pulling up of the maximum current relay 11 is prevented also, since the surrounding of the evaporating vessel 7 with air which gets colder when the heating element 8 is switched on by the maximum current relay 11 counteracts heating of the evaporating liquid by the electric current and thus averts complete closing of the steam valve.

According to Fig. 5, the circuit of the heating element 8 of the thermal relay actuating the steam inlet valve, not shown, is provided with a cut-in relay 39 the energization of which is interrupted by a switch formed of the two arms 40 and 41. The arm 40 is with its upper end disposed in a slot and held by the spring 42 in the position shown in which it abuts against the pin 43. The two temperature feelers 44 and 45 filled with expansion liquid are, respectively, exposed to the air coming from the heater and the outside temperature and are connected with the inside of a spring body 47 which is fixed at one end and whose movable bottom moves against the action of the spring 48 during expansion of the contents of the temperature feelers 44 and 45 and thereby adjusts the arm 40 by means of the pin 43. The arm 41 carrying the counter-contact is flexible and holds an iron core 51 arranged in the field of the coil 49 which takes the place of the maximum current relay in the constructions shown in Figs. 1 to 4 and which is therefore connected so that the sum total of the currents switched on by the compartment regulators 15 flows through it. The arm 41 is further acted upon by the set screw 50 which permits manual adjustment of the normal position of the arm 41. To prevent creeping contact the arm 41 is fitted with an iron core 52 and the arm 40 with a magnet 53 which when the two contact surfaces have approached one another up to a certain small distance insures sudden making of contact and, inversely, equally sudden retracting of the contact surfaces at the breaking of contact.

When the temperature of the heating air rises, the contents of the temperature feeler 44 will expand and extend the spring body 47 which, by means of the pin 43, adjusts the arm 40 so that the contact surfaces touch one another. The relay 39 then switches on the heating element 8, whereby the steam supply to the air heater is throttled. If the temperature of the heating air drops, heating of the thermal relay is interrupted and the steam inlet valve more fully opened. Owing to the arrangement of the temperature feeler 45 exposed to the outer air temperature, the temperature at which switching in and off takes place is in this construction, too, dependent upon the outside temperature and will be the higher the lower the outside temperature is, and vice versa. If both temperature feelers 44 and 45 have the same size, the temperature of the heating air will be kept so that the mean of heating air and outside temperature remains constant.

The position of the other arm 41 is determined by the intensity of the current flowing through the coil 49, which will be the higher the more contact the compartment regulator 15 makes. The greater the excitation of the coil 49 the more will the arm 41 be bent to the left against the action of its specific springiness, so that the contact surfaces approach one another and the temperature of the heating air, at which the heating element is switched on, is consequently lowered. The temperature of the heating air is therefore continually influenced in dependence upon the number of compartments whose room temperature has attained the desired degree.

The distance of the pivot of the arm 40 from the working point of the pin 43 and from the point of contact is so chosen that the pin 43 and thus the spring body 47 need very little travel to bring about an effective adjustment of the contact surfaces. This makes it possible to reduce the contents of the temperature feelers 44 and 45 to a minimum, whereby not only the inertia of the feelers is decreased but also special expansion vessels for taking care of the increase in volume of the filling liquid at high temperatures are rendered superfluous. In case of excessive heating and expansion of the contents of the temperature feelers the pivot of the arm 40 is capable of displacement within the slot 41 against the action of the spring 42, so that the device cannot be damaged by excessive temperatures.

The magnet 49 may be of the rotary type, the rotatable armature of which carries the arm 41. Furthermore, the magnetic flux of the coil 49 may be used for suddenly making and breaking the contact 40, 41.

I claim:—

1. A device for the automatic regulation of the supply of the heating medium to air heaters in air heating plants for railway vehicles provided with compartments, comprising a valve disposed in the piping supplying the heating medium to the air heater, a thermal relay for controlling said valve, said relay comprising a spring body, an evaporating vessel connected with the spring body, an evaporable liquid in the evaporating vessel and an electric heating element in said vessel, a maximum current relay for switching the heating element of the thermal relay on and off, an exciting winding for the maximum current relay, means for supplying current to said heating element and to the exciting winding of the maximum current relay, a contact thermometer and a resistance connected in series therewith in each car compartment, the contact thermometers and resistances in the compartments being connected in parallel with one another and in series with the exciting winding of the maximum current relay.

2. A device for the automatic regulation of the supply of the heating medium to air heaters in air heating plants for railway vehicles provided with compartments, comprising a valve disposed in the piping supplying the heating medium to the air heater, a thermal relay for controlling said valve, said relay comprising a spring body, an evaporating vessel connected with the spring body, an evaporable liquid in the evaporating vessel and an electric heating element in the vessel, a maximum current relay in one of said conductors, an exciting winding for the maximum current relay, means for supplying current to said heating element and to the exciting winding of the maximum current relay, a contact thermometer and a resistance connected in series therewith in each compartment, said contact thermometers and resistances in the compartments being connected in parallel with one another and in series with the exciting winding of the maximum current relay.

3. A device for the automatic regulation of the supply of the heating medium to air heaters in air heating plants for railway vehicles provided with compartments, comprising a valve disposed in the conduit supplying the heating medium to the air heater, a thermal relay for controlling said valve, said relay comprising a spring body, an evaporating vessel connected with said spring body, an evaporable liquid in the evaporating vessel and an electric heating element in the vessel, current supply means, means for connecting the heating element to said current supply means, a cut-in relay in said connecting means, an exciting winding for the cut-in relay, means for connecting said exciting winding to said current supply means, a contact thermometer exposed to the air coming out of the heater and connected in circuit with the exciting winding of said cut-in relay, a maximum current relay in the connecting means for the exciting winding of said cut-in relay, an exciting winding for the maximum current relay, means for connecting the exciting winding of the maximum current relay to said current supply means, a contact thermometer and a resistance connected in series with the exciting winding of said maximum current relay in each compartment, said contact thermometers and resistances in the compartments being connected in parallel with one another and in series with the exciting winding of the maximum current relay.

4. A device for the automatic regulation of the supply of the heating medium to air heaters in air heating plants for railway vehicles provided with compartments, comprising a valve disposed in the conduit supplying the heating medium to the air heater, a thermal relay for controlling said valve, said relay comprising a spring body, an evaporating vessel connected with the spring body, a casing enclosing the evaporating vessel and provided with a supply and discharge conduit for a branch current of the warm air coming out of the air heater, an evaporable liquid in said vessel adapted to develop at the temperature of the warm air coming out of the heater a pressure sufficient for extending said spring body and an electric heating element in said vessel, current supply means, means for connecting the heating element to said current supply means, a cut-in relay in said connecting means, an exciting winding for the cut-in relay, means for connecting said exciting winding to said current supply means, a contact thermometer exposed to the air coming out of the heater and connected in circuit with the exciting winding of said cut-in relay, a maximum current relay in the connecting means for the exciting winding of said cut-in relay, an exciting winding for the maximum current relay, means for connecting the exciting winding of the maximum current relay to said current supply means, a contact thermometer and a resistance connected in series with the exciting winding of said maximum current relay in each compartment, said contact thermometers and resistances in the compartments being connected in parallel with one another and in series with the exciting winding of the maximum current relay.

5. A device for the automatic regulation of the supply of the heating medium to air heaters in air heating plants for railway vehicles provided with compartments, comprising a valve disposed in the conduit supplying the heating medium to the air heater, a thermal relay for controlling said valve, said relay comprising a spring body, an evaporating vessel connected with the spring body, a casing enclosing the evaporating vessel and provided with a supply and discharge conduit for a mixed air current consisting of a branch current of the warm air coming out of the heater and a branch current of the cold air entering the heater, an evaporable liquid in said vessel, and an electric heating element in said vessel, a maximum current relay for switching the heating element of the thermal relay on and off, an exciting winding for the maximum current relay, means for supplying current to said heating element and to the exciting winding of the maximum current relay, a contact thermometer and a resistance connected in series with the exciting winding of the maximum current relay in each compartment, said contact thermometers and resistances in the compartments being connected in parallel with one another and in series with the exciting winding of the maximum current relay, and a permanent resistance bridging the maximum current relay.

6. A device for the automatic regulation of the supply of the heating medium to air heaters in air heating plants for railway vehicles provided with compartments, comprising a valve disposed in the conduit supplying the heating medium to the air heater, a thermal relay for controlling said valve, said relay comprising a spring body, an evaporating vessel connected with the spring body, a casing enclosing the evaporating vessel and provided with a supply and discharge conduit for a mixed air current consisting of a branch current of the warm air coming out of the heater and a branch current of the cold air entering the heater, an evaporable liquid in said vessel and an electric heating element in said vessel, current supply means to which the heating element is connected, a maximum current relay for switching the heating element of the thermal relay on and off, an exciting winding for the maximum current relay, means for connecting the exciting winding of the maximum current relay to said current supply means, a contact thermometer and a resistance connected in series with the exciting winding of the maximum current relay in each compartment, said contact thermometers and resistances in the compartments being connected in parallel with one another and in series with the exciting winding of the maximum current relay, a cut-in relay bridging the maximum current relay, an exciting winding for the cut-in relay, means for connecting the exciting winding of the cut-in relay to said current supply means and a contact thermometer in said last named connecting means, said contact thermometer being arranged in the casing enclosing the evaporating vessel of the thermal relay.

7. A device for the automatic regulation of the supply of the heating medium to air heaters in air heating plants for railway vehicles provided with compartments, comprising a valve disposed in the conduit supplying the heating medium to the air heater, a thermal relay for controlling said valve, said relay comprising a spring body, an evaporating vessel connected with the spring body, an evaporable liquid in said vessel and an electric heating element in said vessel, current supply means, means for connecting the heating element to said current supply means, a cut-in relay in said connecting means, an exciting winding for said cut-in relay, means for connecting the exciting winding of the cut-in relay to said current supply means, a switch in said connecting means, said switch comprising a pivoted arm and a flexible arm, two temperature feelers filled with expansion liquid, one of said feelers being exposed to the outer air and the other to the heating air, means for actuating the pivoted arm of said switch through said temperature feelers, an iron armature on the flexible arm of said switch, a coil surrounding said iron armature, means for connecting said coil to said current supply, a contact thermometer and a resistance connected in series therewith in each compartment, said contact thermometers and resistances in the compartments being connected in parallel with one another and in series with said coil.

FRIEDRICH von SCHÜTZ.